US010109003B1

(12) United States Patent
Jenkins et al.

(10) Patent No.: US 10,109,003 B1
(45) Date of Patent: Oct. 23, 2018

(54) METHOD, MEDIUM, AND SYSTEM FOR ENHANCING PRIVACY

(71) Applicant: Pinterest, Inc., San Francisco, CA (US)

(72) Inventors: Jon Jenkins, San Francisco, CA (US); Catherine Cissy Lee, Mountain View, CA (US)

(73) Assignee: Pinterest, Inc., San Francisco, CA (US)

( * ) Notice: Subject to any disclaimer, the term of this patent is extended or adjusted under 35 U.S.C. 154(b) by 838 days.

(21) Appl. No.: 13/913,365

(22) Filed: Jun. 7, 2013

(51) Int. Cl.
*G06Q 30/00* (2012.01)
*G06Q 30/06* (2012.01)

(52) U.S. Cl.
CPC ................................ *G06Q 30/0633* (2013.01)

(58) Field of Classification Search
CPC ....................... G06Q 30/0615; G06Q 30/0613
USPC ................................................ 705/26.1, 27.1
See application file for complete search history.

(56) References Cited

U.S. PATENT DOCUMENTS 5,815,665 A * 9/1998 Teper ..................... G06Q 20/00 705/26.35
2014/0279222 A1* 9/2014 Lampert ............ G06Q 30/0625 705/26.35

OTHER PUBLICATIONS

Arlitt, Martin, Diwakar Krishnamurthy, and Jerry Rolia. "Characterizing the scalability of a large web-based shopping system." ACM Transactions on Internet Technology 1.1 (2001): 44-69. (Year: 2001).*

* cited by examiner

*Primary Examiner* — Matthew E Zimmerman
(74) *Attorney, Agent, or Firm* — Athorus, PLLC

(57) ABSTRACT

This disclosure describes systems and methods that facilitate purchase of objects from merchants. For example, a user may browse a website available from an object management service and identify objects that they desire to purchase. Rather than having to locate the seller of those objects to make a purchase, the implementations described herein facilitate a connection between the user and the merchant so that the merchant's sales are increased and the user is provided an efficient and safe shopping experience.

13 Claims, 11 Drawing Sheets

METHOD, MEDIUM, AND SYSTEM FOR ENHANCING PRIVACY

BACKGROUND

People are increasingly interacting with computers and other electronic devices in new and interesting ways. With the increased processing capabilities, connectivity and location tracking, electronic devices have become widespread and used in many everyday activities. For example, people often use electronic devices to search for products, watch videos, listen to music, research, shop for both digital and physical products, and receive news, just to name a few. Other uses include e-commerce shopping, communicating with social communities, friends and family, photography, and many others.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

Figure 1:
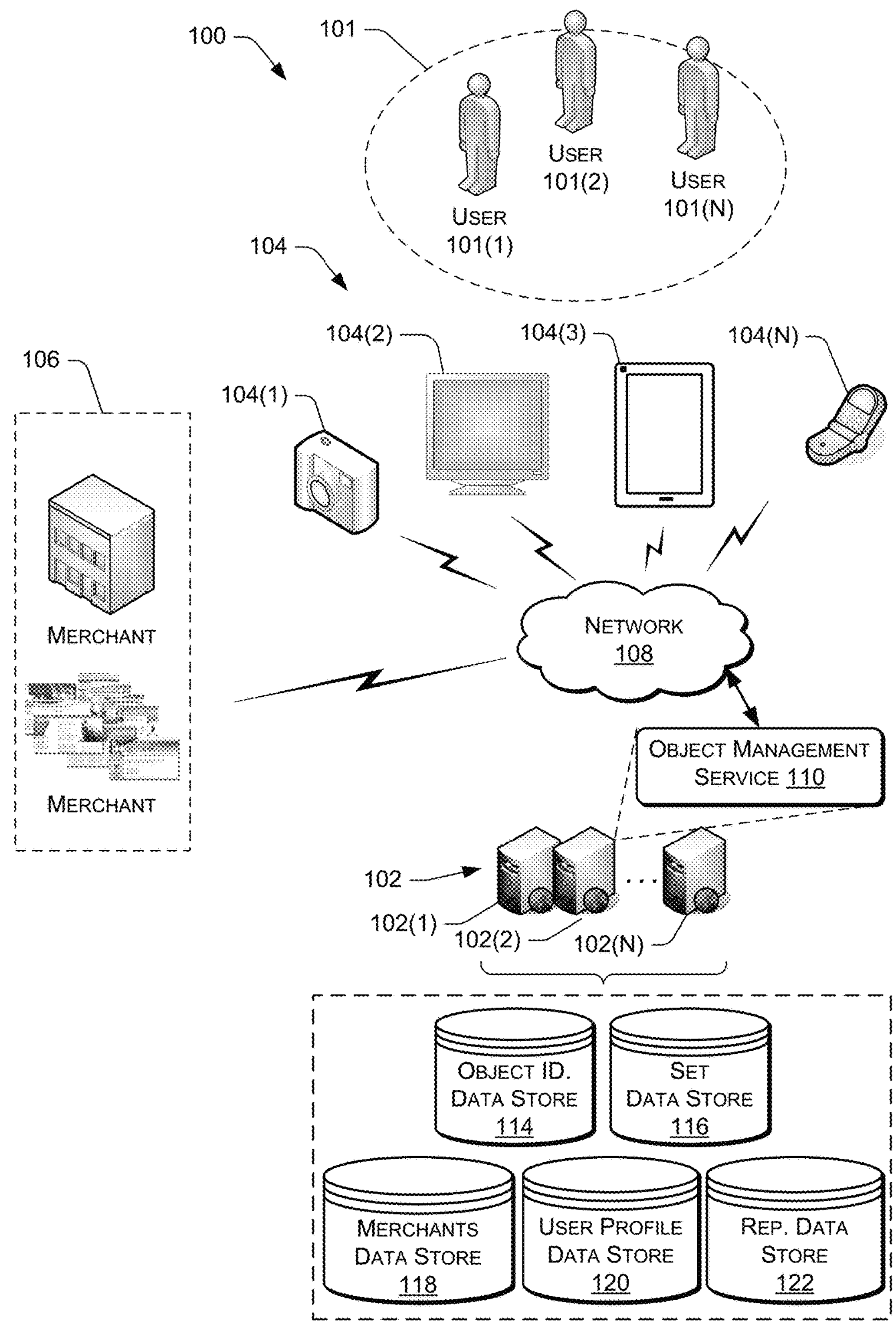
FIG. 1 is a pictorial diagram of an illustrative environment that includes a server system and a client device communicatively connected via a network.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes systems and methods that facilitate purchase of objects from merchants. For example, a user may browse a website available from an object management service and identify objects that they desire to purchase. Rather than having to locate the seller of those objects to make a purchase, the implementations described herein facilitate a connection between the user and the merchant so that the merchant's sales are increased and the user is provided an efficient and safe shopping experience.

To continue with the above example, a user may browse a website, or other user interface made available by an object management service, that includes representations of objects (referred to herein as an "object identifier") and select one or more of those objects for purchase. As the user selects the objects for purchase, the object identifier that represents the object is included in a shopping cart, or cart set, maintained by the object management service.

The objects may be available for purchase from any of a variety of merchants but the object management service allows the user to select for purchase objects of interest, regardless of the merchant. By viewing the cart set in which the object identifiers that represents the objects of interest are included, the user may optimize the cart set based on a variety of criteria prior to initiating purchase of the objects. For example, the user may desire to purchase the objects from one or more preferred merchants (e.g., merchants that the user has identified to the object management service as preferred), purchase the objects such that the total purchase price is minimized (e.g., by considering object prices from each merchant, shipping costs and/or tax), and/or purchase the objects based on a desired delivery schedule. Once the user has selected the merchant(s) from which they desire to purchase the object(s) and selects to purchase the objects, the object management service facilitates the purchase of the object from the merchant. For example, the object management service may identify to the merchant, or the merchant's website, the object the user desires to purchase, identify the user to the merchant and/or transfer the merchant to the merchant's website. In some implementations, the object management service may be able to identify the user to the merchant such that when the user is transferred to the merchant website they are transferred directly to the merchant's checkout process so that the user can complete the purchase of the object from the merchant.

In some implementations, the merchant and/or the user may also notify the object management service that the object has been purchased. In some implementations, the merchant may pay a fee to the object management service for the referral of the user to the merchant's website. In still other examples, the object identifier representative of the purchased object may be transferred from the user's cart set to a purchased set, or any other set identified by the user.

For purposes of discussion, an "object identifier," as used herein, is a collection of one or more items of information that identifies an object based on a user's perspective, or context. The object identifier may include any combination of: a representation for the object, such as a graphical representation, audible representation, or other representation of the object; supplemental information regarding the representation and/or the object; a context for the object as understood by the user; a description of the object provided by the user; any parent object identifier from which the object identifier was created; and any identification of other similar object identifiers. As will be appreciated, additional or fewer items of information may be included in an object identifier.

The methods and systems described herein further enable users to manage, search for, share and discover representations/objects by organizing object identifiers into "sets." For example, users may create one or more sets and object identifiers may be associated with those sets. Generally, a "set" is a collection of object identifiers created by a user. In one implementation, each set may include any number of object identifiers, including zero (a null set). An object identifier may be associated with one or many sets. In one implementation, an object identifier may only be associated with one set. A cart set may be one form of a set.

Supplemental information, as used herein, may be any additional information that may be associated with a representation and/or an object identifier. For example, supplemental information may include, but is not limited to, information about the representation, information about an object represented by the representation, the price of the representation, the price of an object represented by the representation, availability of the representation, availability of the represented object, location of the represented object, identification of the merchant(s) that offer the object for sale, location of the merchant(s), advertisements, etc. Supplemental information may be provided by merchants, users, and/or any other external source.

Users can create object identifiers and add them to sets based on representations for objects provided or identified by the user or by adding existing object identifiers to their own set of object identifiers. Additional information regarding object identifiers and sets can be found in U.S. patent application No. 61/725,462, titled "Management of Objects According To User Context," filed Nov. 12, 2012, the disclosure of which is incorporated by reference herein in its entirety. An "object" may be anything that can be represented. For example, a user may create an object identifier for a television show, an image, a physical object, a sound, a web page, a location, a digital object, and the like. A "representation," as used herein, may be any form of a digital item (e.g., image, video, audio) that represents an object. In some instances, the representation may also be the object.

FIG. 1 is a pictorial diagram of an illustrative environment 100 that includes users 101, such as users 101(1), 101(2)-101(N), a server system 102 that includes one or more server computers 102(1), 102(2)-102(N), one or more client devices 104, such as client device 104(1), 104(2), 104(3)-104(N), and one or more merchants 106, such as an e-commerce website another traditional seller of goods and/or services, communicatively connected via a network 108. As will be appreciated, any number and/or type of server systems 102, client devices 104 and/or merchants 106 may be included in the environment 100 and those illustrated in FIG. 1 are only exemplary. Likewise, any number of users 101 may be included in the environment 100. For purposes of this discussion, the term "user" will be used herein to refer to an individual interacting with the server system 102, object management service 110 (discussed below), and/or one or more of the merchants 106.

The network 108 may include a local area network, a wide area network, such as a public switched telephone network (PSTN), a cable television network, a satellite network, a collection of networks, a public Internet protocol network, a private Internet protocol network, or a combination thereof. Moreover, the network 108 may be wired, wireless, or a combination of the two. The server system 102 may also include an object identifier data store 114, a set data store 116, a merchant data store 118, a user profile data store 120, and a representation data store 122. As discussed further below, the data stores may include lists, arrays, databases, and other data structures used to provide storage and retrieval of data. Likewise, while the disclosure describes multiple data stores, in some implementations, the data stores may be configured as a single data store or multiple data stores.

The object identifier data store 114, set data store 116, merchant data store 118, user profile data store 120, and representation data store 122 may be integrated with the server system 102 or otherwise communicatively coupled with the server system 102. For example, one or more of the object identifier data store 114, set data store 116, merchant data store 118, user profile data store 120, and representation data store 122 may be located at a remote computing resource (not shown) and communicatively coupled with the server system 102. In some implementations, the object identifier data store 114, set data store 116, merchant data store 118, user profile data store 120, and representation data store 122 may include one or more CD-RW/DVD-RW drives, hard disk drives, solid-state drives, tape drives, or other storage devices that are utilized to store digital content and information. The server system 102, separately or together with the object identifier data store 114, set data store 116, merchant data store 118, user profile data store 120, and representation data store 122 may provide an object management service 110 that facilitates user 101 exploration, creation, management and sharing of object identifiers and/or sets into which one or more object identifiers may be included as well as facilitation of the purchase of one or more objects by users from the merchants 106. The object management service 110 may also facilitate the adding and/or updating of supplemental information by merchants 106, users 101 and/or other sources.

In some implementations, the server system 102 may also be configured to exchange information with one or more merchants 106. The merchants 106 may include any type of entity and/or individual(s) that provides a service, website, product or information that may be used, rented, purchased, consumed or otherwise obtained by users 101. For example, a merchant 106 may be an e-commerce website that sells physical and/or digital goods to consumers. Merchants 106 may be associated with a fixed location(s), such as their place of business, a location that may change (e.g., tour guide, mobile health provider) depending on the merchants current location, or no location at all (e.g., digital or virtual business). Digital or virtual businesses include any form of e-commerce or other digital offering that may provide objects, representations and/or supplemental information.

For example, a user of the object management service 110 may obtain a representation of an object from a merchant's e-commerce website and add that representation to the object management service 110 as an object identifier. The merchant 106 may provide as part of the representation, or separately to the object management service 110, supplemental information about the represented object. For example, the merchant 106 may provide supplemental information about the object such as purchase information (e.g., price, quantity in stock, shipping information), product details (e.g., weight, color, manufacturer) and/or other information relevant to the represented object. A user, when viewing the object identifier via the object management service 110, can add the object identifier to a cart set and/or initiate purchase of the represented object from the merchant 106, via the object management service 110. In some implementations, the merchant 106 may interact with the object management service 110 and provide representations for objects along with supplemental information that could then be used to form object identifiers and/or update existing object identifiers. For example, if the representation selected by a user for which an object identifier is to be created is from a merchant's website, the object management service 110 may identify the merchant and obtain supplemental information about the representation and/or the represented object. For example, the merchant may provide supplemental information, such as the price of the representation or represented object, the availability of the object, location of the merchant, hours of operation, contact information, etc.

Supplemental information may also be periodically updated and/or updated each time a user views the object identifier. Those updates are reflected in the object identifiers that include the representation. For example, the merchant may periodically update the price and/or quantity of objects available for purchase. The updated price and/or quantity information may be presented each time the representation and/or the corresponding object identifier(s) are viewed. Similarly, if a user has placed the object identifier in a cart set, the object management service 110 may use the updated supplemental information to notify the user of the change to encourage purchase of the object.

Returning to FIG. 1, client devices 104 may include personal computers, tablet computers, eBook reader devices, laptop computers, desktop computers, netbooks, personal digital assistants (PDA), portable gaming devices, wireless communication devices, such as smart phones or mobile handsets, set-top-boxes, game consoles, cameras, audio recorders/players, or any combination thereof. As will be described with regard to the implementations shown herein, the server system 102 is configured to exchange data and information, including information about sets, such as cart sets, representations, object identifiers, merchants and other like information, with the client device 104. Likewise, a user 101 may interact with the object management service 110, via a client device 104, to create, discover and view object identifiers and sets of object identifiers, obtain information about objects identified by an object identifier, and/or initiate purchase of objects identified by object identifiers.

Supplemental information may be provided by the merchant from which the representation was obtained, from one or more users, from other merchants and/or from other external sources. This information may be updated and/or changed each time a user views the object identifier. For example, user A may have particular merchants from which they prefer to purchase objects. In comparison, user B may prefer other merchants. Depending on which user views the object identifiers, the supplemental information may vary. For example, assuming both merchants sell the object represented by the object identifier, when user A views the object identifier, user A is provided with supplemental information from user A's preferred merchant. In comparison, when user B views the object identifier, user B is provided with the supplemental information provided from user B's preferred merchant. In other implementations, supplemental information and/or merchants for which supplemental information is provided may be provided based on other factors. For example, supplemental information may be selected based on price offered by various merchants, shipping cost, delivery times, quantity in stock, reputation of the merchant, etc.

The object identifier data store 114 maintains information about each object identifier created by the object management service 110. For example, for each object identifier, the object management service 110 may store in the object identifier data store 114 information as to the representation included in the object identifier, the set to which the object identifier is associated, the user that created the object identifier, the context for the object identifier, any user provided description for the object identifier, any supplemental information associated with the object identifier, the provider of the representation included in the object identifier and any parent object identifier from which the information was obtained.

The set data store 116 includes information about each set established by users of the object management service 110. As discussed above, a set is a collection of object identifiers that a user creates. A set may be a null set that does not include any object identifiers. Likewise, any number of object identifiers may be associated with a set. The set data store 116 for each set stores information that identifies the user that created the set, the context for the set, a category for the set, any user provided description for the set, any static information associated with the set and an identification of object identifiers associated with the set. For example, each user may have a cart set in which object identifiers for objects the user may desire to purchase are included. As discussed below, the cart set may be used to organize from which merchants the objects are purchased and/or to facilitate purchase of the objects via one or more identified merchants.

The merchants data store 118 stores information about merchants that sell objects that are represented by object identifiers managed by the object management service 110. The merchant data store 118 may include any form of information about each merchant including, but not limited to, the name of the merchant, whether the merchant is associated with the object management service 110, the type of information provided by the merchant, a merchant identifier used by the object management service 110 to identify and/or communicate with the merchant, identification of representations associated with the merchant, and the like.

The user profile data store 120 stores information about users 101 of the object management service 110. Any type of information may be stored in the user profile data store 120. For example, user profile information, such as attributes, name, address, gender, browse history, object identifier history, set history, purchase history, preferred merchants, merchant identifiers for the user, social networks and/or friends with which the user 101 interacts, and the like may be stored in the user profile data store 120. User profile information may be provided directly by users 101, provided by merchants from which users have purchased objects via a facilitation by the object management service 110, collected from users 101 of the client devices 104 when interacting with the object management service 110 (e.g., clickstream data as the user explores the object management service 110), when viewing, creating or interacting with sets, when viewing, creating or interacting with object identifiers, and/or when sharing information with friends or social communities through the object management service 110. In some implementations, users of the object management service 110 may choose to limit the amount of information included in their user profile, to limit access to their user profile information and/or to limit what information is shared, if any, from their user profile information.

The representations data store 122 stores representations that are included in one or more object identifiers. In addition to storing representations, supplemental information about the representation may also be maintained in the representations data store 122. For example, supplemental information provided by various merchants about a representation and/or a represented object may be maintained in the representations data store 122. In other implementations, supplemental information may be maintained in other data stores accessible by the object management service 110. An identification or association between each object identifier that includes the representation and each merchant that offers the represented object for sale may also be maintained in the representations data store 122.

In addition to maintaining information about object identifiers, sets, sources, users, and representations, the object management service 110 may provide use information back to the users 101 and/or the merchants 106. For example, the object management service 110, through communication between the server system 102 and a client device 104, may provide use information back to a user 101. Such information may include an identification of object identifiers recently viewed, objects purchased, object identifiers created or added, identification of object identifiers in the user's cart set, identification of preferred merchants, identification of others that have viewed the user's sets, object identifiers, and the like. Likewise, the object management service 110, through communication between the server system 102 and the merchants 106, may provide information to the merchants 106. Such information may include analytics about representations and/or objects associated with the merchant 106, such as how often objects are added to a cart set but not purchased, purchased through a different merchant, and the like.

Figure 2:
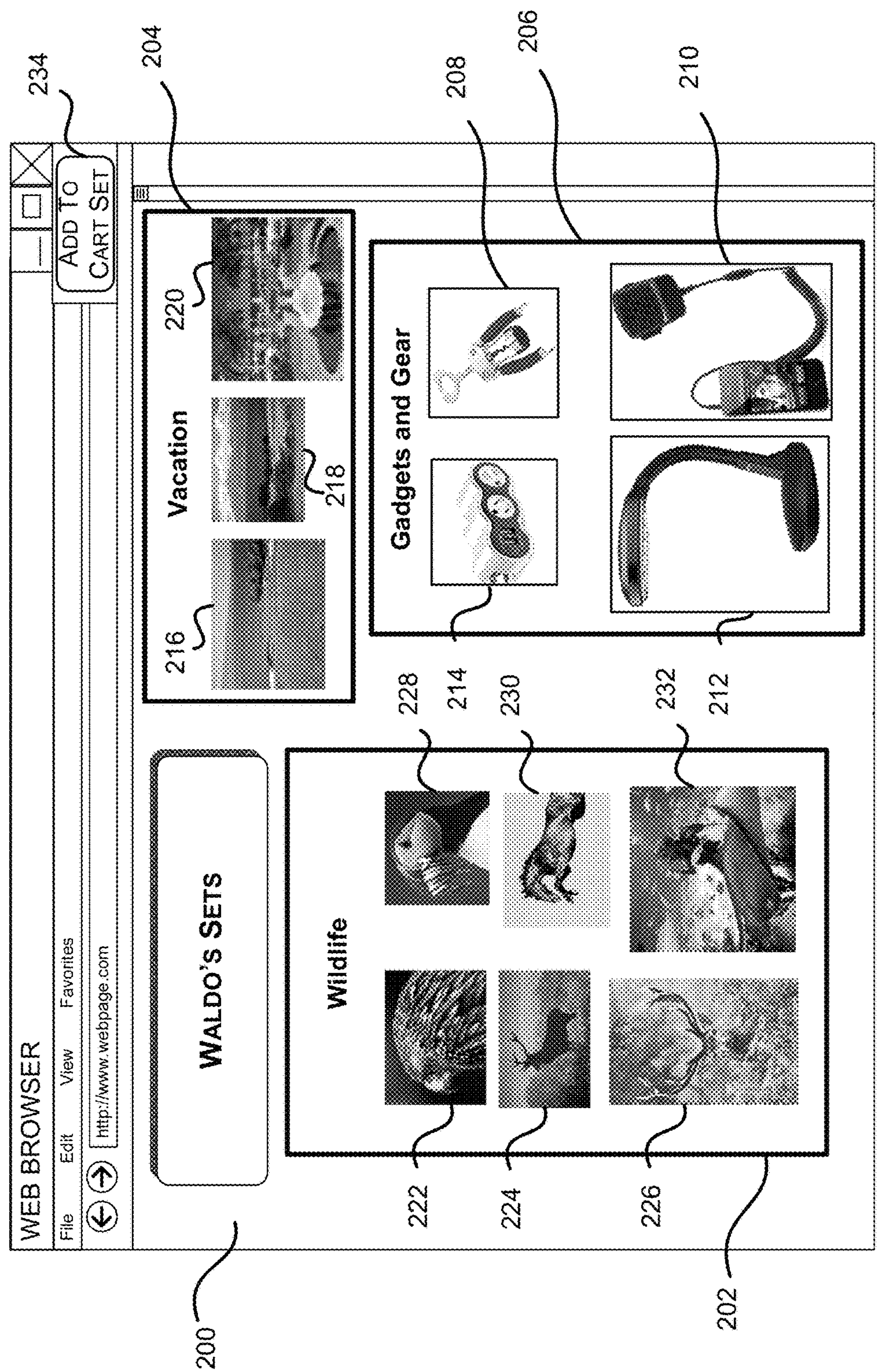
FIG. 2 is a block diagram of an example user interface for presenting object identifiers to a user, according to an implementation.

FIG. 2 is a block diagram of an example user interface 200 for presenting object identifiers to a user, according to an implementation. In the example user interface 200 the object identifiers have been arranged into sets—Wildlife 202, Vacation 204, and Gadgets and Gear 206. As discussed, above an object identifier may represent any object and/or be the object itself. Likewise, some object identifiers may represent objects that can be purchased from a merchant, such as object identifiers 208, 210, 212, 214, 216, 218, 220, or objects that are not available for sale from a merchant, such as object identifiers 222, 224, 226, 228, 230, 232. Objects that are for sale by one or more merchants may be physical goods, such as the objects represented by object identifiers 208-214, services, such as the objects represented by object identifiers 216-220, digital goods (not shown), or any other item or service that can be purchased, rented, borrowed, consumed or otherwise obtained by a user from a merchant.

A user may view and interact with object identifiers, organize object identifiers into sets 202, 204, 206, select to add one or more object identifiers to a cart set, or initiate purchase of the object represented by an object identifier. In some implementations, a user may select an add to cart set control 234 and have one or more of the object identifiers added to the user's cart set. For example, a user may select one or more object identifiers using an input component of a client device 104 and through selection of the add to cart set control 234 have the selected one or more objects added to the user's cart set. In another implementation, the add to cart set control 234 may be configured to add all purchasable objects represented by an object identifier that is associated with a set of the user added to the user's cart set.

Figure 3A:
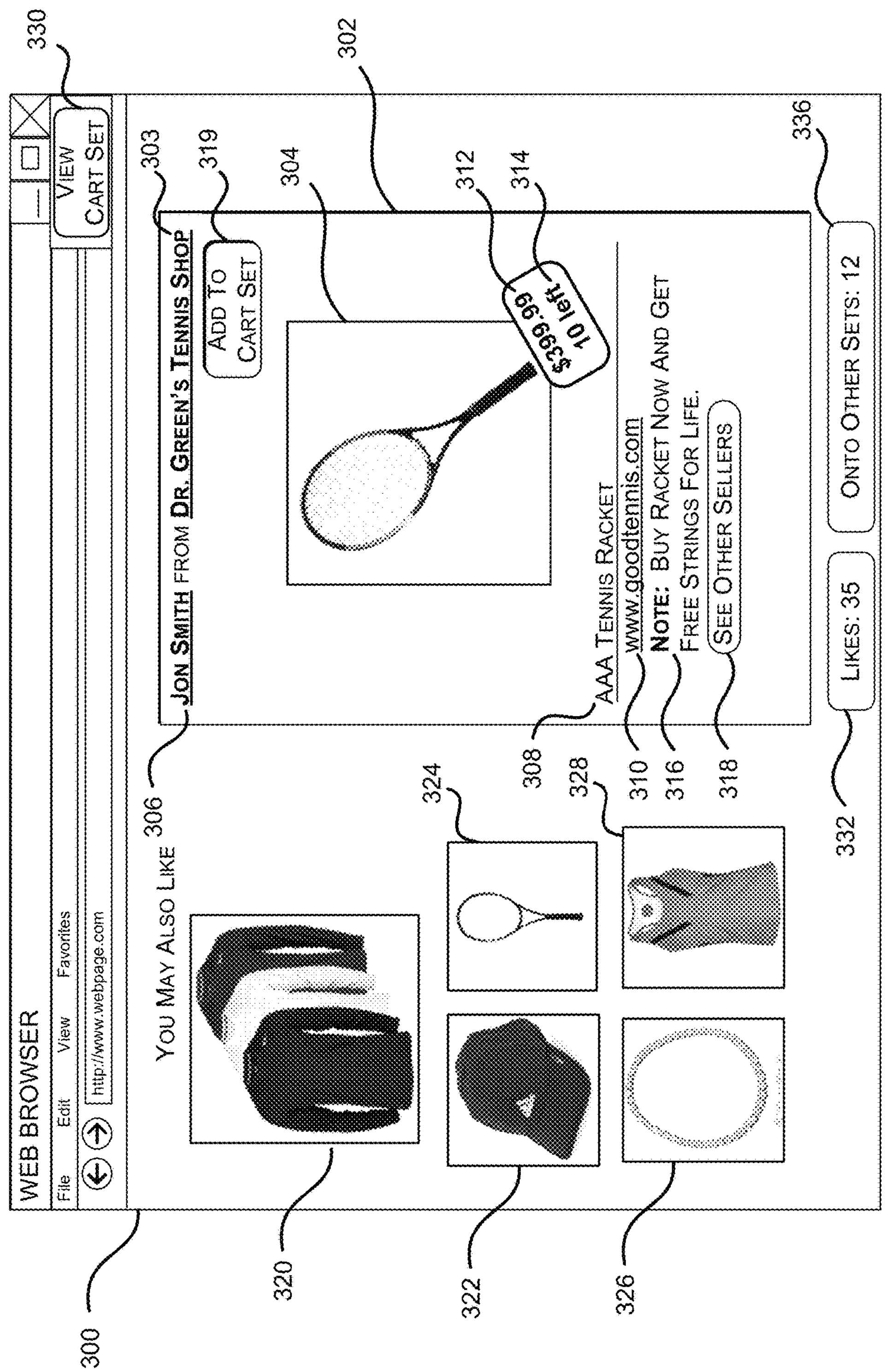
FIG. 3A is a block diagram of an example user interface of an object identifier, according to an implementation.

In some implementations, the graphical user interface may also provide supplemental information about one or more object identifiers. For example, FIG. 3A is another example user interface 300 of an object identifier that includes supplemental information, according to an implementation. As illustrated in the user interface 300, the user has selected an object identifier and requested to obtain additional information about the object identifier. In this example, the user interface 300 provides additional information associated with the object identifier 302. The additional information for the object identifier 302 includes the representation 304 associated with the object identifier 302, an identification of the creator 306 of the object identifier "John Smith," and an identification 303 of the merchant website from where the representation was obtained, in this case "Dr. Green's Tennis Shop."

Other supplemental information may also be presented as part of the object identifier 302. For example, the title 308 of the representation may be provided along with an identifier 310 of a user's preferred merchant that is selling the represented object, information 316 or advertisements provided by the merchant about the object and/or a control 318 to allow the user to view other merchants that are willing to sell the represented object. The price 312, quantity available 314 and/or other like information may also be included in the object identifier 302. In some implementations, a user viewing the object identifier 302 may select to add the object identifier to the user's cart set, through selection of the add to cart set control 319.

In addition to providing additional information about the object represented by the object identifier 302, the user interface 300 may also provide an identification of other object identifiers 320, 322, 324, 326, 328 that may be of interest to the user. Other object identifiers may be identified based on the user's browsing history, what other objects are included in the user's cart set, the object identifier 302 currently being viewed, and/or any other information. In this example, because the user is viewing an object identifier for a tennis racket, the object management service 110 knows the user is female, and the user has placed other tennis related objects in the user's cart set, the object management service 110 identifies and suggests other object identifiers 320-328 that represent objects that are of potential interest to the user. In some implementations, the other object identifiers may represent other objects that are also available for purchase from the merchant selling the object represented by the object identifier 302 being viewed by the user.

The user interface 300 may also identify other users of the object management service 110 who have indicated whether they like or dislike the object identifier 302 or commented on the object identifier. For example, the Likes counter 332 identifies that 35 other users have identified that they like the object identifier 302. Likewise, the Onto Other Sets counter 336 identifies that the object identifier 302 and/or the representation 304 has been added to 12 other sets that are managed by the object management service 110.

A user may also select to view the user's cart set from any of the example user interfaces and/or to initiate purchase of objects stored in the user's cart set. For example, a user viewing the example user interface 300 may select the view cart set control 330 and the object management service 110 will present a cart set control to the user.

Figure 3B:
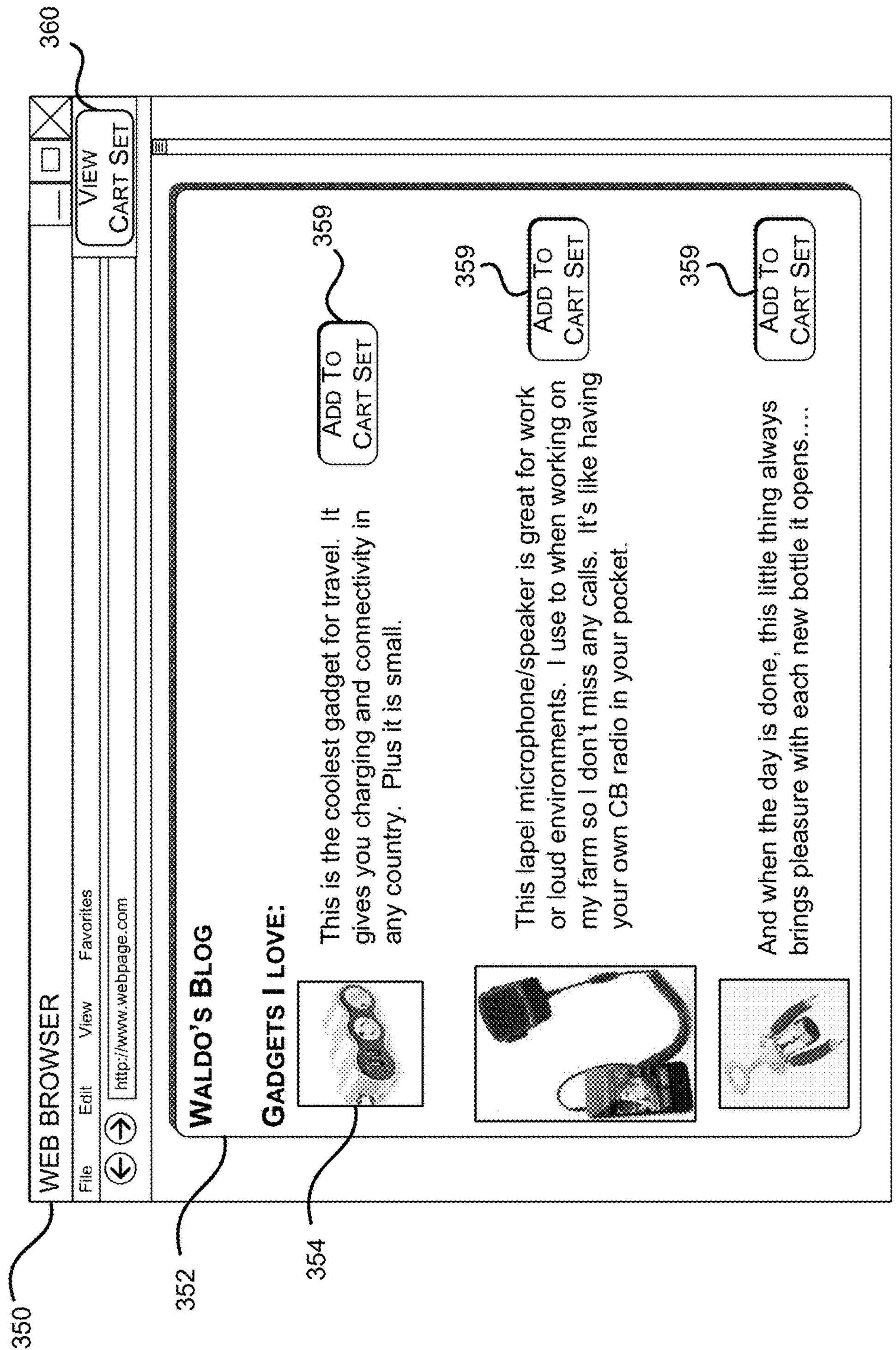
FIG. 3B is a block diagram of an example user interface of an external web site that includes an add to cart set identifier, according to an implementation.

FIG. 3B provides an example of a user interface 350 of an external website, Waldo's Blog 352, that includes one or more add to cart controls 359, according to an implementation. In this example, add to cart controls 359 may be included on the external website, such as Waldo's Blog 352, and a user may interact with an add to cart control 359 to add the object to the user's cart set that is managed by the object management service 110. For example, a user may select to add the object represented by object identifier 354 to their cart set by selecting the Add To Cart Set Control 359. Upon selecting the control 359, an object identifier may be created that includes the representation 354, information about the source of the representation, etc. In some instances, the object management service 110 may also determine if there are merchants that offer the represented object for sale and may associate those merchants with the created object identifier. In still other examples, the provider of the webpage may be a merchant and/or may identify a merchant that offers the represented object for sale. In such an example, the merchant information may be provided with the representation and included as part of the created object identifier.

While the above example illustrates an add to cart set control adjacent to each represented object that may be purchasable, in other implementations, there may be a single add to cart set control that, when selected, may identify representations on the webpage and allow the user to select the intended representation of the object they desire to add to their cart set. Likewise, a user may select to view their cart set through selection of the view cart set control 360.

Figure 4:
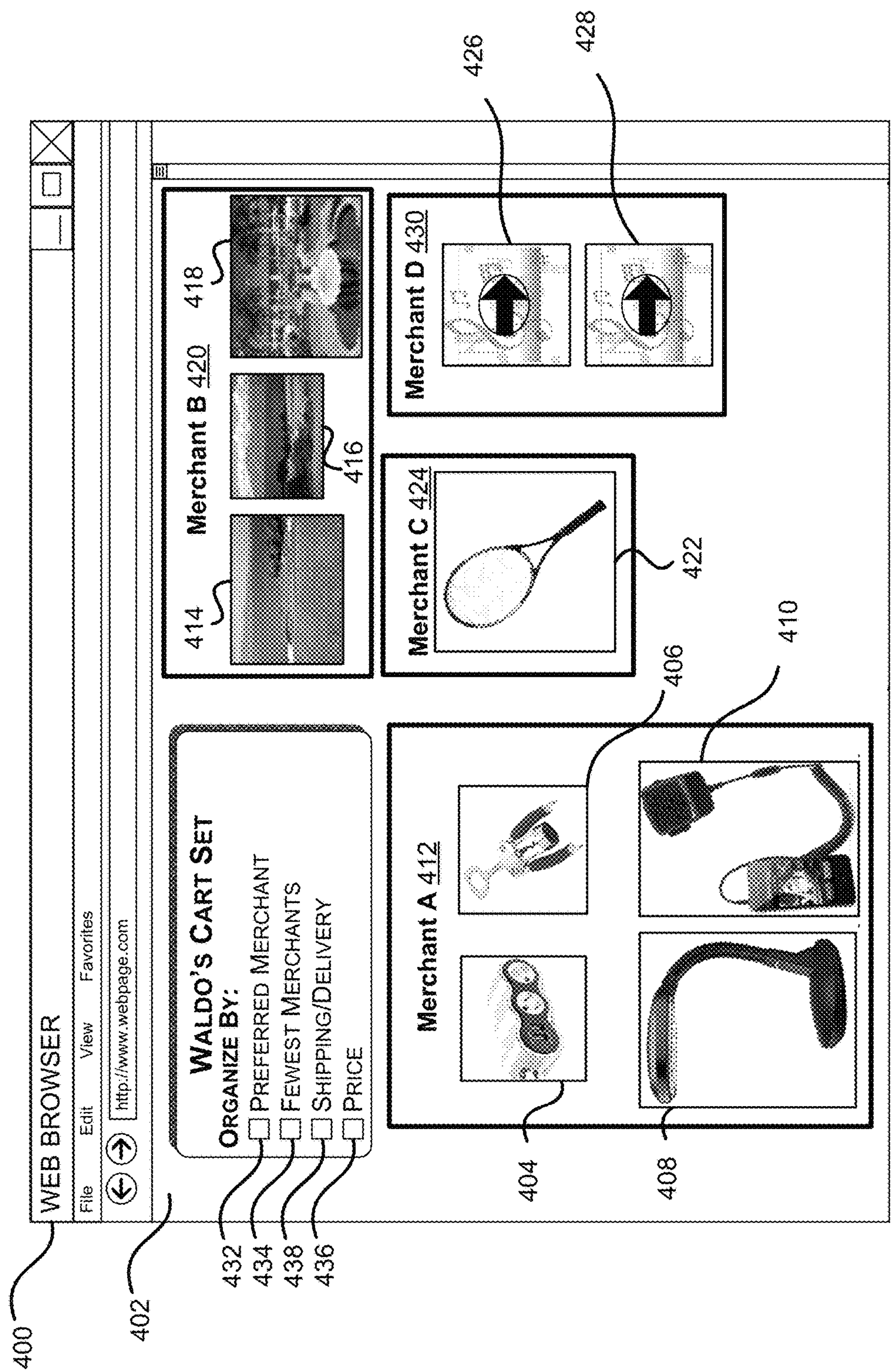
FIGS. 4-5 are block diagrams of example user interfaces of a cart set, according to an implementation.

FIG. 4 is a block diagram of an example user interface 400 that includes a cart set 402, according to an implementation. The cart set 402 includes each object identifier that the user has selected to have added to the user's cart set. The arrangement of the object identifiers in the cart set may be done in a variety of ways. For example, as illustrated in FIG. 4, the object identifiers are arranged by the merchant that was associated with the object identifier when it was added to the user's cart set. For example, the objects represented by the object identifiers 404, 406, 408, 410 are all available for purchase from Merchant A 412. The objects represented by object identifiers 414, 416, 418 are all available for purchase from Merchant B 420. The object represented by object identifier 422 is available for purchase from Merchant C 424. The objects represented by object identifiers 426, 428 are available for purchase from Merchant D 430.

As illustrated in this example, a user may place an object identifier representative of any type of purchasable object in a cart set and any combination of object types and/or merchants may be included in the cart set. For example, the objects represented by object identifiers 404-410, 422 are physical goods, the objects represented by object identifiers 414-418 are services and the objects represented by object identifiers 426-428 are digital objects.

Regardless of the objects represented by object identifiers included in the user's cart set and/or the merchants selling the objects, the user may select to organize the cart set according to one or more criteria. For example, the user may select to organize the object identifiers based on preferred merchant(s) 432, fewest merchants 434, lowest total cost combination 436, shipping and/or delivery time 438, price per object, lowest price, manufacture location, payment terms, delivery options, capabilities of the object, compatibility of the object, etc.

In some implementations, if the user selects more than one criteria, the user may also identify an order of importance for the selected criteria. For example, if the user selects to organize the cart based on both preferred merchant 432 and lowest total cost combination 436, the user may specify which criteria is to be considered first. If the user selects preferred merchant 432 as the primary criteria, the object management service will first identify which objects are sold by a user preferred merchant and associate those object identifiers with the preferred merchant. If there is more than one preferred merchant that is able to sell an object represented by an object identifier the object management service will then consider the second criteria, lowest total cost combination 436. Likewise, for any object identifiers for which there is not a preferred merchant, the object management service may identify a lowest total cost for the represented object. As discussed below, the lowest total cost may consider the price of the object, shipping and delivery costs, tax and any other costs that may be associated with the object.

Continuing with the above example, if the user selects to organize the cart set 402 based on the criteria of fewest merchants 434, the object management service 110 determines the combination of the objects represented in the cart set that results in the fewest number of merchants selling the objects to the user. For example, the cart set 402 identifies four different merchants from which the objects may be purchased. Upon selection of the fewest merchants control 434 the example user interface may provide a modified cart set, such as that illustrated in FIG. 5.

Figure 5:
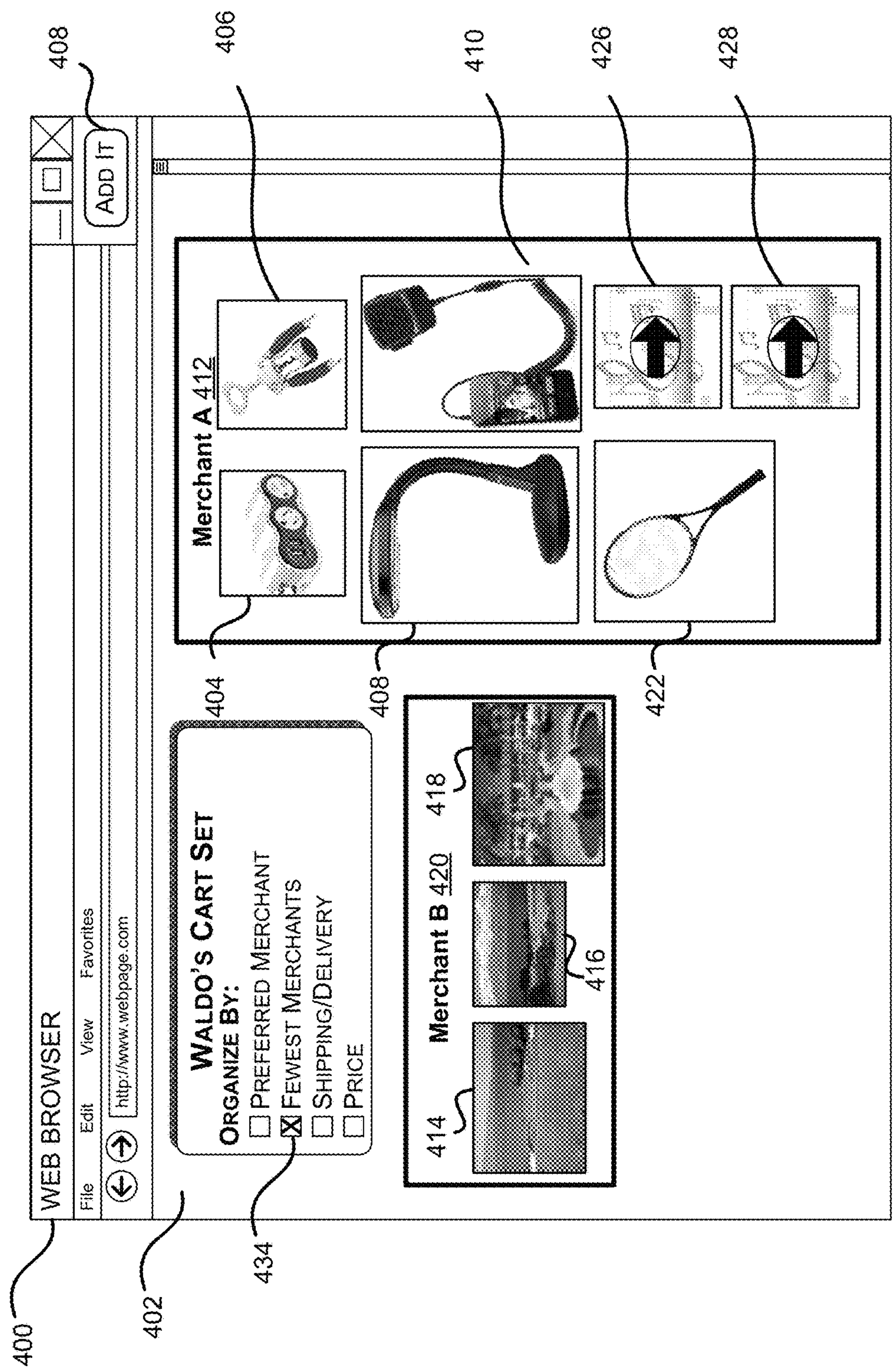

FIG. 5 is a block diagram of an example user interface of a cart set with the object identifiers organized such that the represented objects can be purchased from a fewest number of merchants, according to an implementation. In this example, all of the objects represented by object identifiers in the user's cart set can be purchased from two merchants, Merchant A 412 and Merchant B 420. As illustrated, the objects represented by object identifiers 404, 406, 408, 410, 422, 426, 428 can all be purchased from Merchant A 412 and objects 414, 416, 418 can all be purchased from Merchant B 420.

By allowing the user to include object identifiers representing various types of objects available from various different merchants into a single cart set, the object management service 110 provide the ability for the user to organize how and from what merchant(s) they want to purchase the objects. Likewise, in some implementations, multiple users may collaborate in selecting the object identifiers and/or merchants that are to be included in the cart set. For example, the cart set may be used for wedding planning. The bride-to-be and the wedding coordinator can select object identifiers representative of objects (e.g., flowers, photographers, dresses, tables) to include in the cart set regardless of the merchant(s) that offer those objects. Likewise, the object identifiers can be arranged according to a variety of factors and the cart set can be used to facilitate purchase of the objects represented by the object identifiers in the cart set from the selected merchants.

As another example, the cart set may be a shared purchase experience. For example, multiple users may participate in the selection of objects to be included in the cart set and share in the cost of the purchase of those items, regardless of their destination or the selling merchant(s). To illustrate, a group of users may be planning a camping trip and selecting the supplies they need; each needed supply added to the cart set by one of the users. The cart set may be configured such that all of the objects are delivered to a single location, yet each of the users share the cost of the purchase. The cost may be shared equally or based on any other distribution as selected by the users.

In some implementations, rather than treating the cart set as a single cart, it may effectively operate as multiple carts, one for each merchant and objects may be moved between merchant carts with the cart set based on selected organization criteria. At any time, a user may select to purchase one, some or all of the objects represented by object identifiers included in the cart set. Likewise, if each merchant grouping of objects is treated as a cart for that merchant, the user may select to initiate a purchase from one or more of the merchants. Likewise, when a user is viewing an object identifier that is not currently in the user's cart set, the user can select to purchase the represented object.

In still other implementations, a user may select to copy or clone a cart set. For example, user A may be viewing the cart set of user B and select to include all of the object identifiers from user B's cart set into their own cart set, thereby creating a copy of the cart set. In a similar manner a user may select to automatically repopulate one or more objects in the cart set after a defined period of time. For example, the user may include an object in their cart set that they desire to purchase from a merchant every month. After each purchase, the object identifier is repopulated into the cart set so that the represented object can be purchased again the following month.

When a user selects to purchase one or more objects, as discussed in further detail below, the object management service 110 notifies the selected merchant of the object that the user desires to purchase and optionally an identification of the user. For example, a merchant may provide an application programming interface ("API") through which the object management service may provide identifying information to the merchant to facilitate purchase of the object by the merchant.

Figure 6:
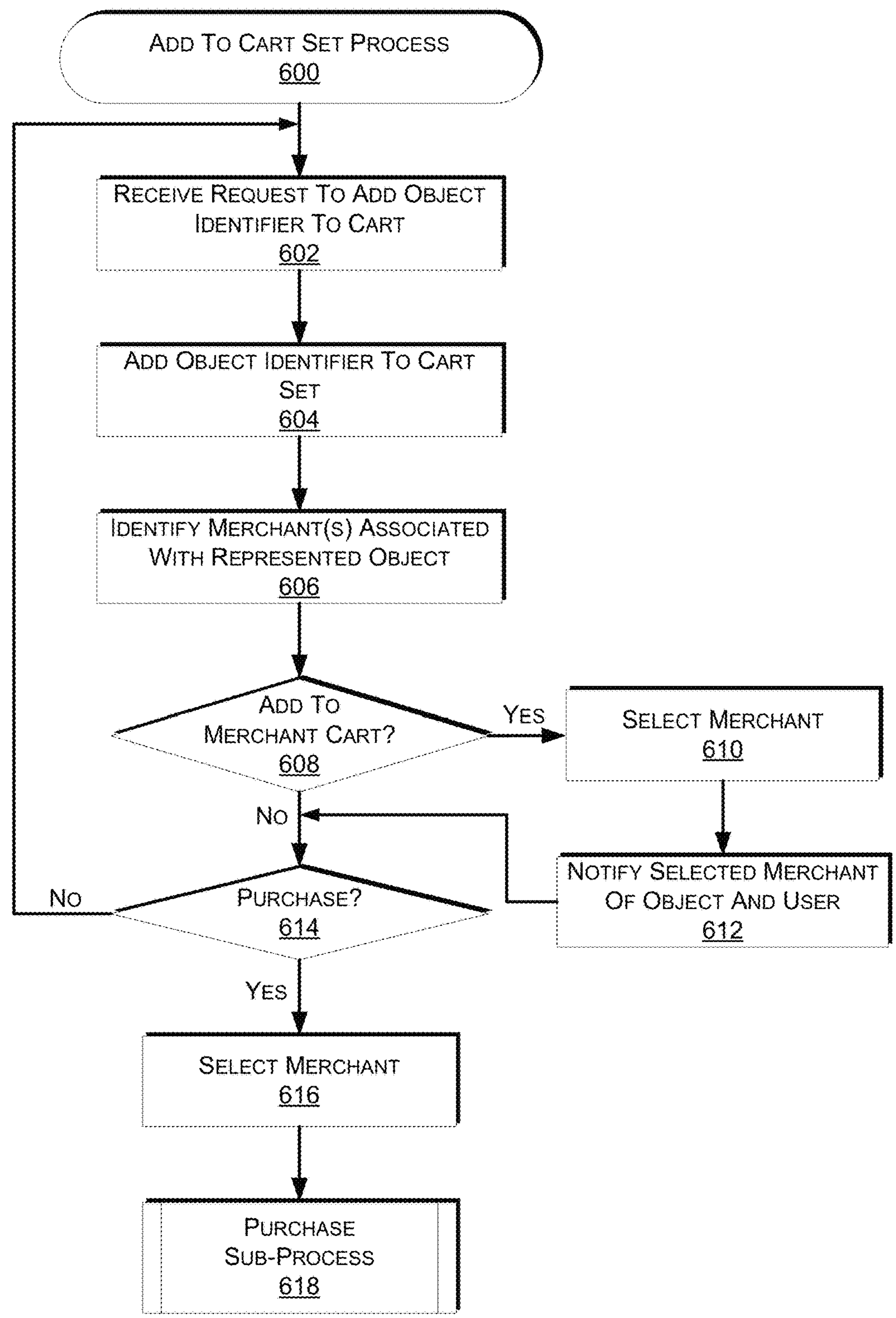
FIG. 6 illustrates an example process for adding an object identifier to a cart set, according to an implementation.

FIG. 6 illustrates an example process 600 for adding an object identifier to a cart set and optionally initiating a purchase of an object, according to an implementation. The example process 600 and each of the other processes described herein are illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, solid-state drives, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process. Likewise, additional or fewer operations than those described may be utilized with the various implementations described herein.

The example process 600 begins upon receiving a request to add an object identifier to a cart set, as in 602. A request to add an object identifier to a cart set may be provided from any web page, such as those discussed above. For example, a user may be viewing a web page with several presented object identifiers and select to add one or more of those object identifiers to the cart set. Likewise, multiple users may collaborate and add objects to a cart set.

For each request, the corresponding object identifier is added to the user's cart set, as in 604, and one or more merchants associated with the object identifier and/or the object represented by the object identifier are determined, as in 606. A merchant may be associated with an object identifier and/or the represented object if, for example, the representation included in the object identifier was obtained from the merchant's website, provided by the merchant, identified by other users as a seller of the represented object, the merchant has identified itself as a seller of the represented object, etc.

In addition to identifying the merchant(s) that offer the represented object for sale, a determination may be made as to whether the object should be added to a checkout cart of the merchant, as in 608. In some implementations, a user may select to immediately purchase an object rather than just add it to the user's cart set. In such an implementation, in additional to, or as an alternative to adding the object identifier to the user's cart set, the object management service may also determine that the object should be added to a checkout cart of a merchant. In other implementations, if only one merchant sells the object, the example process 600 may determine to add the object to the merchant's checkout cart on behalf of the user.

If it is determined that the represented object should be added to a checkout cart of the merchant, a merchant is selected, as in 610. If there is only one merchant that is able to sell the object, that one merchant may be selected. However, if there are multiple merchants associated with the object identifier and/or the represented object, the example process may ask the user to select a merchant. Alternatively, the user may have already identified preferred merchants and if one of the selling merchants is a preferred merchant, that user preferred merchant may be selected. In still other examples, the merchant with the lowest price and/or fastest shipping speed may be selected. Alternatively, the example process 600 may randomly select a merchant. As will be appreciated, a number of factors may be considered when selecting a merchant.

Once a merchant is selected, the selected merchant is notified of the user's interest in purchasing the represented object, as in 612. Likewise, an identification of the user may also be provided to the merchant. In some implementations, information may be passed to the merchant so the object is added to a checkout cart and available for purchase when/if the user decides to actually purchase the object. For example, a merchant may have a uniform resource locator (URL) that can be used to pass an identification of the objects and/or the user to the merchant. For example, the URL of www.merchant_a/object_management_service/add_to_cart/may be used to identify objects and/or the user to merchant A. In this example, each object added to the user's cart that is to be purchased by the user may be identified by adding each to the end of the URL and separating each object by a comma. In some examples, a merchant have already provided the object management service with object identifiers that may be used by the object management service to identify the objects to the merchant. As another example, the merchant may provide an API that can be used by the object management service 110 to identify objects to the merchant that are to be added to the user's checkout cart.

In addition to identifying the objects to the merchant, the example process 600 may also identify the user to the merchant. As discussed below, in some implementations, a merchant identifier for the user may be known by the object management service 110 and used to identify the user to the merchant. In other examples, if a merchant identifier is not known, the example process 600 may query the cookies stored in the user's browser, identify a cookie of the merchant and provide that cookie to the merchant to assist in identifying the user. In still other examples, the example process 600 may provide some identifying information (e.g., user name, user email address) known to the object management service to assist in identifying the user to the merchant. If the user cannot be identified and/or if a user account does not exist with the merchant for the user, the example process 600 may coordinate with merchant and establish an account for the user and/or add the identified objects to a guest checkout account. If establishing an account on the user's behalf, information known to the object management service 110, such as a user name and email address may be provided to the merchant and used to create an account. When/if the user elects to purchase the object from the merchant, as part of the checkout process with the merchant, the user may provide additional information necessary to complete account creation and/or object purchase.

Returning to the example process 600, if it is determined that the represented object is not to be added to a merchant checkout cart, or after identifying the objects and optionally the user to the merchant, it may be determined whether the user has selected to purchase the object or one more of the objects represented by an object identifier in the user's cart set, as in 614. If the user has not selected to purchase an object, the example process 600 returns to block 602 and continues. If the user has decided to purchase one or more objects, if not already selected, a merchant for the object is selected, as in 616. Techniques for selecting a merchant are discussed above with respect to block 610. Additional techniques for selecting merchants based on object identifiers in a user's cart set are discussed below. Upon selection of a merchant(s), the example process initiates the purchase sub-process 618. The purchase sub-process 618 is discussed below with respect to FIG. 8.

Figure 7:
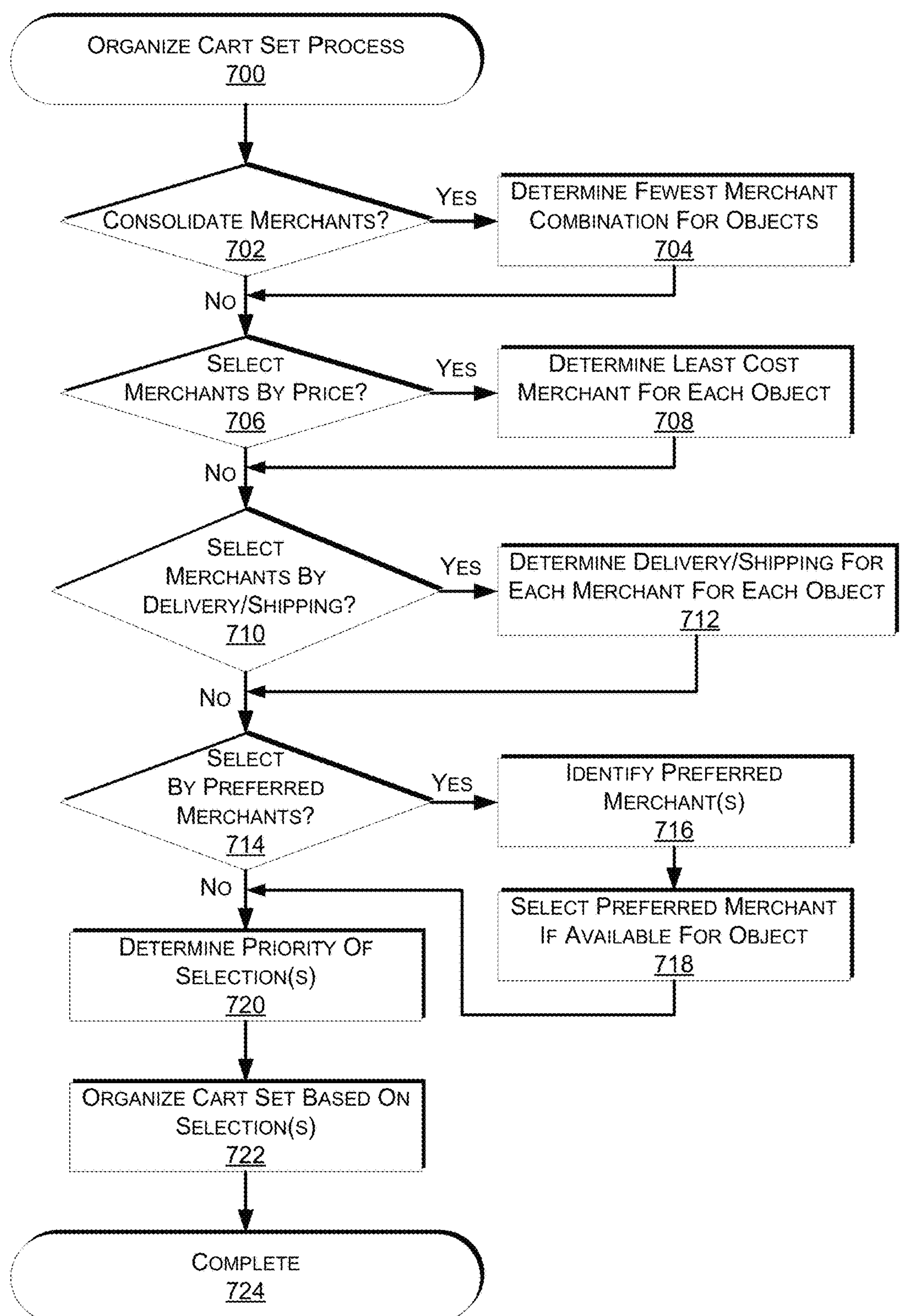
FIG. 7 illustrates an example process for organizing a cart set, according to an implementation.

FIG. 7 illustrates an example process 700 for organizing a cart set, according to an implementation. The example process 700 may be initiated by the user at any time when two or more objects are included in the user's cart set. Generally described, the example process 700 may be used to provide the user with different purchase options for objects represented by object identifiers in the user's cart set. For example, a user may select to purchase objects from the least number of merchants, for the lowest total cost, from preferred merchants, by shipping/delivery time, etc. and the example process with organize the object identifiers in the cart set accordingly. While the example process 700 is illustrated as a logical flow, any of the decisions 702, 704, 706, 710, 714 may be performed in any order and/or in parallel.

The example process 700 begins by determining whether the user has selected to consolidate the object identifiers included in the user's cart set by merchants, as in 702. If it is determined that the user has selected to organize the object identifiers to consolidate merchants, a fewest merchant combination for the represented objects is determined, as in 704. For example, if the user has added five object identifiers to their cart set and those objects are offered for sale by one or more of merchants A-D, the example process may determine which combination of merchants and objects provides the least number of merchants from which to purchase the represented objects. Table 1 illustrates a matrix showing the merchants and whether they sell the products included in the user's cart set.

TABLE 1

| | Object 1 | Object 2 | Object 3 | Object 4 | Object 5 |
|---|---|---|---|---|---|
| Merchant A | | X | | X | X |
| Merchant B | | | | | X |
| Merchant C | | | X | X | |
| Merchant D | X | X | | X | X |

Based on the matrix, the objects can be consolidated such that they can all be purchased from a total of two merchants. For example, the user can purchase objects 1, 2, 4, 5 from Merchant D and purchase object 3 from merchant C. As another alternative, the user could purchase objects 1, 2, 5 from Merchant D and objects 3, 4 from Merchant C. Depending on the objects represented in the user's cart set and/or the merchants that sell those objects, there may be multiple combinations that satisfy the fewest merchant criteria. This may be resolved and a fewest merchant combination recommended to the user and/or each combination may be presented to the user for selection. In the implementation discussed herein, resolution of multiple matches may be determined at blocks 720 and 722 after all organization criteria have been selected, because other selections may eliminate some of the matching candidates. In other implementations, a matching fewest merchant combination may be selected and recommended to the user at any point in the example process 700.

If it is determined that either consolidate by fewest merchants has not been selected or after determining the potential fewest merchant combinations, it may be determined whether to select merchants by price, as in 706. For example, a user may select to organize the objects represented in the cart set based on the least cost. If it is determined that the objects are to be organized based on least cost, the example process may determine the cost of each object from the merchants that offer the object for sale, as in 708. This may be done individually for each object and merchant combination and/or based on a potential combination of objects with a single merchant. For example if the cost includes shipping, some merchants may offer free shipping on orders over a particular dollar amount, free shipping to certain users, and/or flat rate shipping per order.

The cost may be the price of the object and/or the price of the object plus other costs (e.g., shipping, tax), referred to herein as total purchase cost. Continuing with the above example, the example process may determine the total purchase cost to purchase each of objects 1-5 from merchants A-D, as illustrated in Table 2.

TABLE 2

| | Object 1 | Object 2 | Object 3 | Object 4 | Object 5 |
|---|---|---|---|---|---|
| Merchant A | | $10.50 | | $4.00 | $12.23 |
| Merchant B | | | | | $15.23 |
| Merchant C | | | $22.95 | $9.50 | |
| Merchant D | $9.99 | $15.50 | | $4.00 | $19.25 |

Based on the matrix illustrated in Table 2, the object identifiers can be organized by merchants based on the lowest price. For example, Merchant D would be selected as the seller for objects 1, 4, Merchant A selected as the seller for objects 2, 5, and Merchant C as the seller for object 3. As an alternative, Merchant D may be selected as the seller for object 1 and merchant A may be selected as the seller for objects 2, 4, 5, because both merchants offer object 4 at the same price.

If there are multiple merchants that offer the same object for the same price, the example process 700 may select a single merchant for the object to recommend to the user and/or each qualifying merchant may be presented to the user for selection. In the implementation discussed herein, resolution of multiple matches may be determined at blocks 720 and 722 after all organization criteria have been selected, because other selections may eliminate some of the matching candidates. In other implementations, a matching merchant may be selected and recommended to the user at any point in the example process 700.

If it is determined not to select merchants based on price or after determining a least cost combination, it may be determined whether to select merchants based on delivery/shipping times, as in 710. If it is determined to organize the object identifiers in the user's cart set by delivery/shipping time, the delivery/shipping time may be determined for each merchant, as in 712. This may be done for just shipping time (the time it takes before the order is actually shipped by the merchant), delivery time (the time it takes to ship the order) and/or based on the total time and estimated delivery date to the user. In another implementation, the user may select a preferred carrier for use in delivering the objects and/or may organize the object identifiers based on the carrier and/or shipping options (e.g., next-day, two-day, ground) offered by the merchants.

In this example, the example process 700 determines the estimated total delivery time (estimated delivery date to the customer) for each merchant, as illustrated in Table 3 below.

TABLE 3

| | Object 1 | Object 2 | Object 3 | Object 4 | Object 5 |
|---|---|---|---|---|---|
| Merchant A | | 5 Days | | 5 Days | 5 Days |
| Merchant B | | | | | 2 Days |
| Merchant C | | | Next Day | 3 Days | |
| Merchant D | 3 Days | 3 Days | | Two Weeks | 3 Days |

Based on the matrix illustrated in Table 3, the object identifier can be organized by merchants based on the delivery time. For example, Merchant D would be selected as the seller for objects 1, 2, Merchant C selected as the seller for objects 3, 4 and Merchant B as the seller for object 5. If there are multiple merchants that offer the same delivery time, the example process may select a single merchant for the object to recommend to the user and/or each qualifying merchant may be presented to the user for selection. In the implementation discussed herein, resolution of multiple matches may be determined at blocks 720 and 722 after all organization criteria have been selected, because other selections may eliminate some of the matching candidates. In other implementations, a matching merchant may be selected and recommended to the user at any point in the example process 700.

If it is determined not to select merchants based on delivery/shipping or after determining a merchant based on delivery/shipping time, it may be determined whether to select merchants based on user merchant preferences, as in 714. If it is determined to organize the object identifiers in the user's cart set by preferred merchants, the example process 700 may identify the preferred merchants for the user, as in 716. Preferred merchants may be identified based on prior purchase history of the user, ratings by the user of merchants, selection by the user of preferred merchants, etc.

For example, the user may have specified that it prefers merchants A and D. In such an example, the object identifiers would be organized such that objects 1, 2, 4, 5 are associated with merchant D and object 3 is associated with Merchant C, because Merchant C is the only seller of object 3. In instances where an object is not available for purchase from a preferred merchant, the user may be notified of which objects are not available for purchase from a preferred merchant. Likewise, if multiple preferred merchants sell the same object, the example process 700 may select a preferred merchant on the user's behalf, the user may have ranked the priority of each preferred merchant, a preferred merchant may be selected at random, based on other organization criteria, etc.

Once the example process 700 has determined which organization criteria have been selected by the user, if there is more than one criterion selected, it may determine a priority for each selected criteria, as in 720. For example, the user may identify the priority of each selected criteria and/or the example process may recommended a priority. For example, if the user has selected to organize the cart based on lowest price and preferred merchants, the example process 700 may determine which criteria has the highest priority for organizing the object identifiers. Any number of criteria may be selected and prioritized.

Based on the selected and prioritized criteria, the example process may determine the appropriate organization by merchant of the object identifiers in the user's cart set, as in 722. Continuing with the above example, if the user has selected the criteria of lowest price and delivery time, and specified that lowest price is the priority criteria, the example process 700 compares the options available (see Table 2 and Table 3) to organize the object identifiers in the user's cart set. In this example, objects 2, 4 and 5 will be organized together and identified as purchasable from Merchant A. Object 3 would be identified as purchasable from Merchant C and object 1 would be identified as purchasable from Merchant A.

By combining criteria, as in this example, it may reduce the organization into a single optimal organization for the user. For example, in this instance, even though object 4 was available for sale from both Merchant A and Merchant D for $4.00, Merchant A was selected because it is able to deliver the object faster. If there are multiple combinations that equally satisfy the selected organization criteria, the user may be notified of the different combinations and allowed to select a preferred combination. In other implementations, the example process may consider other criteria (e.g., preferred merchants) until a single solution is identified. In still other examples, a matching combination may be randomly selected, selected based on merchant status with the object management service, etc. For example if there are two matching combinations but one of those combinations relates to an associated merchant and one does not, the example process may resolve in favor of the associated merchant. Associated merchants are discussed in further detail below.

Once the object identifiers in the user's cart set have been organized based on the criteria selected by the user, the organized cart is presented to the user and the example process 700 completes, as in 724.

While the example process 700 describes organization of a cart set according to one of several criteria, in other implementations, additional or fewer criteria may be available for selection. For example, manufacture location of the objects, payment terms (e.g., charge at purchase, charge at delivery), compatibility of the object with other objects owned by the user, and the like may also be provided as criteria available for selection and use in organizing object identifiers included in a cart set.

Figure 8:
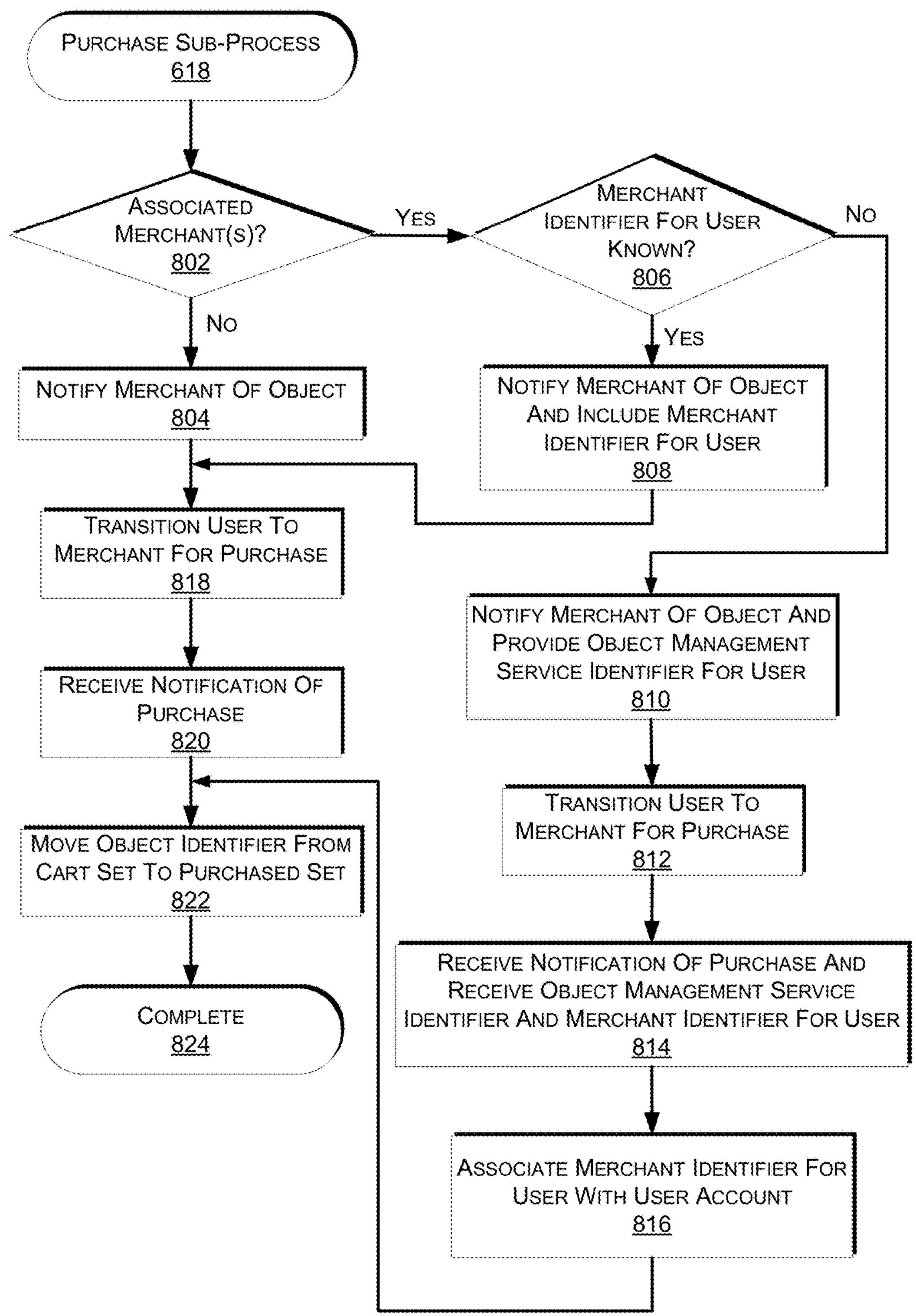
FIG. 8 illustrates an example sub-process for facilitating purchase of an object, according to an implementation.

FIG. 8 illustrates further details on the example sub-process 618 for facilitating purchase of an object, according to an implementation. The example sub-process 618 begins by determining if there if the object(s) is sold by one or more associated merchants, as in 802. An associated merchant is any merchant that coordinates with the object management service to facilitate purchase of objects. For example, if a merchant provides a URL through which the object management service can notify the merchant of objects that a user may desire to purchase and/or identify users to the merchant, such a merchant may be considered an associated merchant. Likewise, a merchant may be considered an associated merchant if it provides an API through which users and/or objects may be identified to the merchant. In still other examples, an associated merchant may provide merchant identifiers for users to the object management service so that the object management service can identify the user.

A merchant identifier for a user, as used herein, may be any identifier that is provided by a merchant that can be used to identify a user. For example, a merchant may generate a unique code or random number that is associated with a merchant account for a user and provide that unique code to the object management service. Each time a user is interacting with the object management service and selects to purchase one or more objects from that merchant, the object management service may provide the merchant identifier for the user to the merchant to identify the user. Use of a merchant identifier for a user eliminates the need for the user, the merchant and/or the object management service to provide personally identifiable information about the user.

The merchant identifier for a user may be obtained by the object management service and associated with a user in a variety of ways. For example, a merchant may interface with the object management service and provide the user a log-in screen to identify themselves to the merchant. Once identified, the merchant can provide a merchant identifier to the object management service 110 that the object management service associates with the user's account. In another implementation, the first time the user, when interacting with the object management service, selects to purchase an object from the merchant, the object management service may identify the objects to the merchant and provide an object management service identifier for the user. Similar to a merchant identifier for the user, an object management service identifier for the user may be any unique identifier or random number that is provided by the object management service to the merchant to identify the user.

Once the user is transitioned to the merchant and identifies themselves to the merchant, the merchant may return to the object management service both the object management service identifier for the user that was provided as well as the merchant identifier for the user. The object management service, upon receiving the combination of both identifiers, may associate the merchant identifier for the user with the user's account.

Returning to FIG. 8, if it is determined that the merchant is not an associated merchant, the merchant may be notified of the objects identified by the user that they want to purchase. In some implementations, an identification of the user may not be provided to the merchant. In other implementations, the user may be asked to provide information that will identify the user to the merchant and that information may be provided to the merchant. In still other implementations, some information (e.g., user name, email address) may be provided to the merchant to assist the merchant in identifying the user.

If it is determined that the merchant is an associated merchant, it may be determined if a merchant identifier for the user is known by the object management service, as in 806. If the merchant identifier for the user is known, the merchant may be notified of both the merchant identifier for the user and the objects that the user desires to purchase, as in 808. However, if it is determined that the merchant identifier for the user is not known, the merchant may be notified of the objects the user desires to purchase and be provided with an object management service identifier for the user, as in 810. In some instances, additional information (e.g., user name, email address) that can be used by the merchant to identify the user may also be provided. In other implementations, the user may be asked to provide information that can be used to identify themselves to the merchant.

Regardless of whether the merchant is an associated merchant receiving a merchant identifier for the user and an identification of objects, an associated merchant receiving an object management service identifier for the user and an identification of objects, or a non-associated merchant receiving an identification of objects, the information provided to the merchant can be included in a checkout cart of the merchant to facilitate purchase by the user from the merchant. For example, if the user is identifiable by the merchant, the objects may be placed in a checkout cart associated with the user. If the user is not identifiable by the merchant, the objects may be placed in a guest checkout cart or a temporary checkout cart that is transitioned to the user's account once identified.

In some implementations, the object management service may initiate creation of a user account with the merchant. For example, if the user does not have an account with the merchant, or if the user's account with the merchant cannot be identified, basic information may be provided to the merchant and used to initiate generation of a user account for the user. In one implementation, the object management service may provide the user's name and e-mail address and the receiving merchant may utilize that information to generate an account for the user and associate a checkout cart including the object identified by the user with that new account. When the user is transitioned from a website of the object management service to the merchant, discussed below, the user may provide any additional information needed to complete the user account creation and/or purchase the objects from the merchant.

Returning to FIG. 8, once the objects, the merchant identifier for the user and/or the object management service identifier for the user have been provided to the merchant (blocks 804, 808, 810), the user is transitioned to the merchant for purchase of the objects, as in 812 and 818. Transition of the user to the merchant may be done by redirecting the user to the merchant's website. In another implementation, in response to receiving notification of the objects, the merchant may return a URL that is to be used to transition the merchant to an appropriate webpage, such as a checkout process that includes the objects identified by the user. In such an example, the object management service may utilize the URL to transition the user to the merchant.

After the user has been transitioned to the merchant, the merchant may control the purchase of the objects. Once purchase has been completed, if the example sub-process 618 provided the merchant with an identification of the objects and an object management service identifier for the user to the merchant, it receives a notification of the purchase of the objects, the provided object management service identifier for the user and a merchant identifier for the user, as in 814. The received object management service identifier for the user and the merchant identifier for the user may be used to identify the user to the object management service and the merchant identifier for the user may be associated with the user's account at the object management service, as in 816.

If the merchant is a non-associated merchant, the example sub-process 618 may only receive a notification that the object has been purchased, as in 820. This is optional and may be provided by the merchant, the user or not at all. Once the sub-process 618 has received notification of the purchase, the object identifier representing the object may be moved from the user's cart set to another set associated with the user, as in 822. For example, the object identifier may be removed from the cart set and added to a purchase set associated with the user. In another implementation, the object identifier representative of the object may only be removed from the cart set and not added to any other set associated with the user. In still another example, the object identifier may already be included in another set associated with the user. In such an example, the object identifier may be removed from the cart set and the other instance of the object identifier may be updated to include supplemental information identifying that the user has purchased the object. Upon removing the object identifier from cart set, the example process completes, as in 824.

Figure 9:
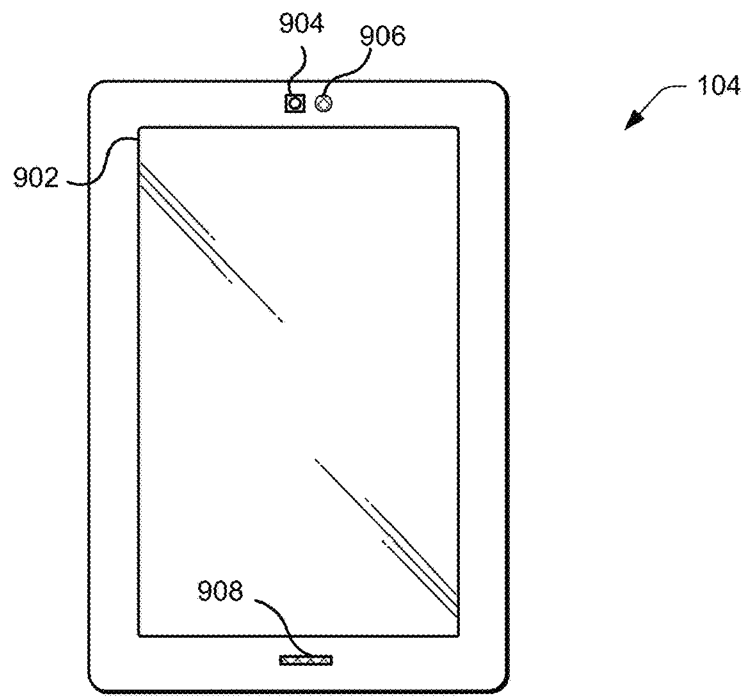
FIG. 9 illustrates an example computing device that can be used in accordance with various implementations.

FIG. 9 illustrates an example client device 104 that can be used in accordance with various implementations described herein. In this example, the client device 104 includes a display 902 and optionally at least one input component 904, such as a camera our touch screen, on the same side of the device as the display 902. The client device 104 may also include an audio transducer, such as a speaker 906, and optionally a microphone 908. Generally, the client device 104 may have any form or input/output components that allow a user to interact with the client device 104. For example, the various input components for enabling user interaction with the device may include a touch-based display 902 (e.g., resistive, capacitive, Interpolating Force-Sensitive Resistance (IFSR)), camera (for gesture tracking, etc.), microphone, global positioning system (GPS), compass or any combination thereof. One or more of these input components may be included on a device or otherwise in communication with the device. Various other input components and combinations of input components can be used as well within the scope of the various implementations as should be apparent in light of the teachings and suggestions contained herein.

Figure 10:
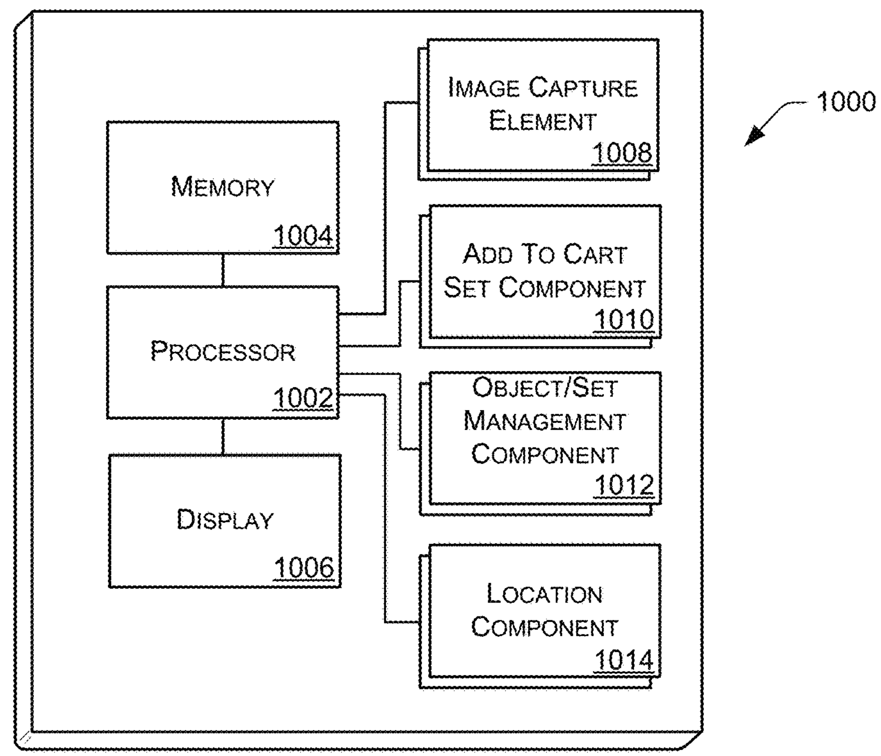
FIG. 10 illustrates an example configuration of components of a computing device, such as that illustrated in FIG. 9.

In order to provide the various functionality described herein, FIG. 10 illustrates an example set of basic components 1000 of a client device 104, such as the client device 104 described with respect to FIG. 9 and discussed herein. In this example, the device includes at least one central processor 1002 for executing instructions that can be stored in at least one memory device or element 1004. As would be apparent to one of ordinary skill in the art, the device can include many types of memory, data storage or computer-readable storage media, such as a first data storage for program instruction for execution by the processor 1002. Removable storage memory can be available for sharing information with other devices, etc. The device typically will include some type of display 1006, such as a touch-based display, electronic ink (e-ink), organic light emitting diode (OLED) or liquid crystal display (LCD).

As discussed, the device in many implementations will include at least one image capture element 1008, such as one or more cameras that are able to image objects in the vicinity of the device. An image capture element can include, or be based at least in part upon any appropriate technology, such as a CCD or CMOS image capture element having a determined resolution, focal range, viewable area, and capture rate. The device can include at least one add to cart set component 1010 for performing the process of obtaining attribution information for a representation, and/or interacting with the object management service 110 as part of the process of creating an object identifier and or otherwise utilizing a representation. For example, the client device may be in constant or intermittent communication with the object management service 110 and may exchange information, such as representations, representation identifiers, descriptions, provider information, etc. with the object management service 110 as part of the process for obtaining attribution information for a representation and/or creating an object identifier.

The device may also include an object/set management component 1012 that stores and manages information about existing object identifiers and/or sets created by or otherwise associated with the user of the client device. Storing and maintaining such information on the device provides the ability for a user to interact with and use many of the various implementations discussed herein even in the event the client device cannot communicate with the object management service 110.

The device also can include at least one location element 1014, such as GPS, NFC location tracking or Wi-Fi location monitoring. Location information obtained by the location element 1014 may be used with the various implementations discussed herein to identify the location of the user, source location, object location, and the like and support the creation, modification and/or management of sets and/or object identifiers.

The example client device 104 may also include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations. In some implementations, however, such a device might not include any buttons at all and might be controlled only through touch (e.g., touch-based display), audio (e.g., spoken) commands, or a combination thereof.

Figure 11:
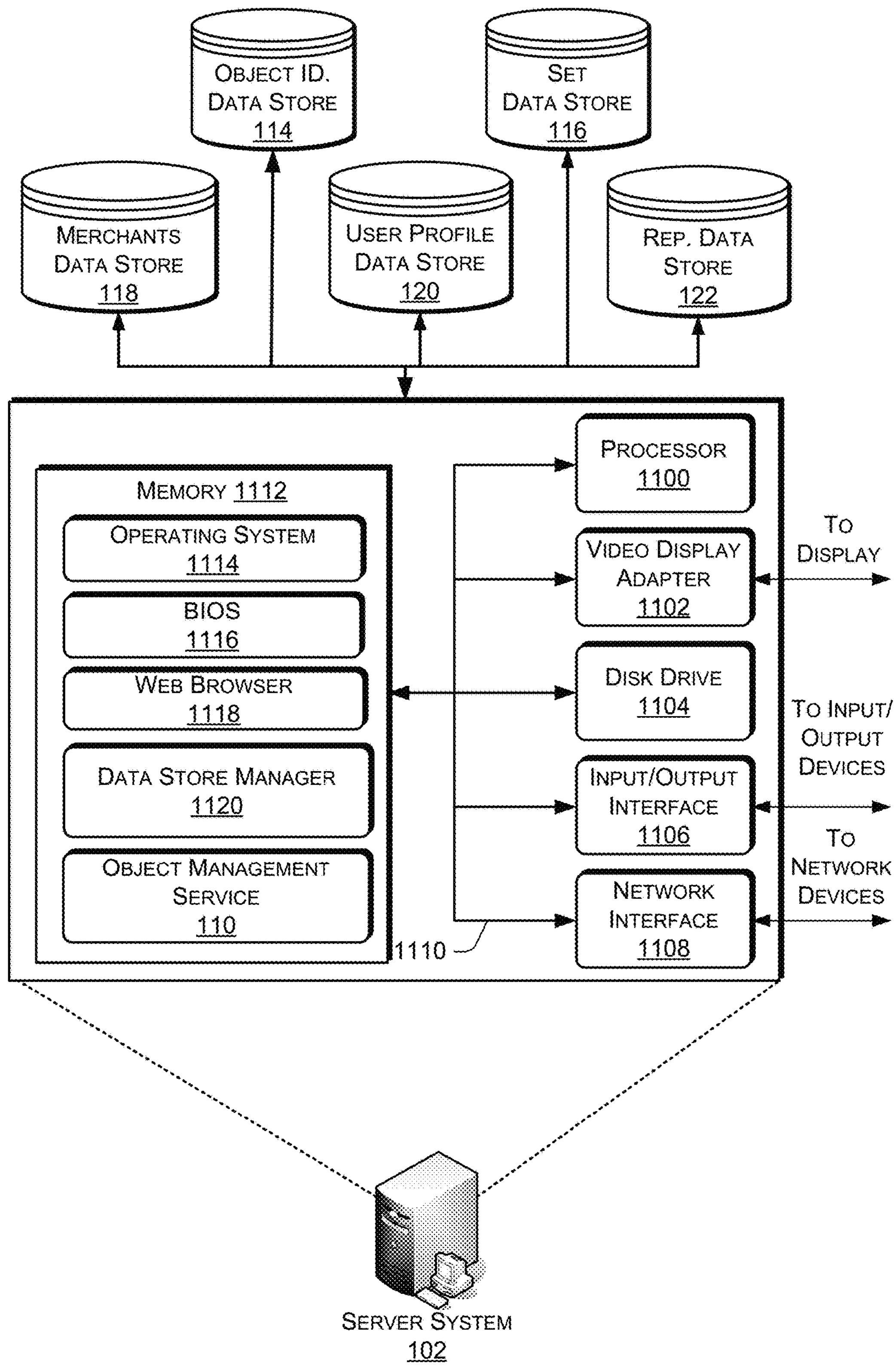
FIG. 11 is a pictorial diagram of an illustrative implementation of a server system that may be used for various implementations.

FIG. 11 is a pictorial diagram of an illustrative implementation of a server system, such as the server system 102, that may be used in the environment of FIG. 1. The server system 102 may include a processor 1100, such as one or more redundant processors, a video display adapter 1102, a disk drive 1104, an input/output interface 1106, a network interface 1108, and a memory 1112. The processor 1100, the video display adapter 1102, the disk drive 1104, the input/output interface 1106, the network interface 1108, and the memory 1112 may be communicatively coupled to each other by a communication bus 1110.

The video display adapter 1102 provides display signals to a local display (not shown in FIG. 11) permitting an operator of the server system 102 to monitor and configure operation of the server system 102. The input/output interface 1106 likewise communicates with external input/output devices not shown in FIG. 11, such as a mouse, keyboard, scanner, or other input and output devices that can be operated by an operator of the server system 102. The network interface 1908 includes hardware, software, or any combination thereof, to communicate with other computing devices. For example, the network interface 1908 may be configured to provide communications between the server system 102 and other computing devices, such as the client device 104, via the network 108, as shown in FIG. 1.

The memory 1112 generally comprises random access memory (RAM), read-only memory (ROM), flash memory, and/or other volatile or permanent memory. The memory 1112 is shown storing an operating system 1114 for controlling the operation of the server system 102. A binary input/output system (BIOS) 1116 for controlling the low-level operation of the server system 102 is also stored in the memory 1112.

The memory 1112 additionally stores program code and data for providing network services that allow client devices 104 and merchants 106 to exchange information and data files with the server system 102 and/or the object management service 110. Accordingly, the memory 1112 may store a browser application 1118. The browser application 1118 comprises computer executable instructions, that, when executed by the processor 1100 generate or otherwise obtain configurable markup documents such as Web pages. The browser application 1118 communicates with a data store manager application 1120 to facilitate data exchange and mapping between the object identifier data store 114, the set data store 116, the merchant data store 118, the user profile data store 120, and/or the representations data store 122, client devices, such as the client device 104 shown in FIG. 1 and/or external sources, such as the merchants 106 shown in FIG. 1.

As used herein, the term "data store" refers to any device or combination of devices capable of storing, accessing and retrieving data, which may include any combination and number of data servers, databases, data storage devices and data storage media, in any standard, distributed or clustered environment. The server system 102 can include any appropriate hardware and software for integrating with the data stores 114-122 as needed to execute aspects of one or more applications for the client device 104, the merchants 106 and/or the object management service 110. The server system 102 provides access control services in cooperation with the data stores 114-122 and is able to generate content such as text, graphics, audio, video and/or object identifier or set related information (e.g., representations, context, descriptions, mappings, analytics about user interfaces) to be transferred to the client device 104 or external sources 106.

The data stores 114-122 can include several separate data tables, databases or other data storage mechanisms and media for storing data relating to a particular aspect. For example, the data stores 114-122 illustrated include mechanisms for storing content, user information, cart sets, mappings and external source information, representations, which can be used to generate and deliver content to client devices 104 and/or merchants 106 (e.g., sets, object identifiers, representations) and control actions to be performed.

It should be understood that there can be many other aspects that may be stored in the data stores 114-122, such as access rights information, which can be stored in any of the above listed mechanisms as appropriate or in additional mechanisms of any of the data stores 114-122. The data stores 114-122 are operable, through logic associated therewith, to receive instructions from the server system 102 and obtain, update or otherwise process data in response thereto.

The memory 1112 may also include the object management service 110, discussed above. The object management service 110 may be executable by the processor 1100 to implement one or more of the functions of the server system 102. In one implementation, the object management service 110 may represent instructions embodied in one or more software programs stored in the memory 1112. In another implementation, the object management service 110 can represent hardware, software instructions, or a combination thereof.

The server system 102, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction in FIG. 11 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing system, comprising:

one or more processors; and a memory coupled to the one or more processors and storing computer-executable instructions that when executed by the one or more processors cause the one or more processors to at least:

receive, at an object management service, via a network and from a merchant that is independent of the object management service, a merchant identifier for a first user account of a user associated with the merchant, wherein the merchant identifier is a code that corresponds to the first user account with the merchant and that uniquely identifies the user account to the merchant without including any personally identifiable information about the user;

associate, at the object management service, the merchant identifier with an object management service identifier for a second user account of the user associated with the object management service;

subsequent to an association of the merchant identifier with the object management service identifier:

receive at the object management service, via the network and from an electronic device associated with the user, a request to add an object identifier to a cart set of the object management service, wherein:

the object identifier indicates an object, and is accessible from the object management service; and the cart set is associated with the user;

in response to the request, add the object identifier to the cart set;

subsequent to addition of the object identifier to the cart set, receive at the object management service, via the network, a request from the electronic device to purchase the object;

determine the merchant that is able to sell the object;

subsequent to the request to purchase the object being received from the electronic device, provide from the object management service and to the merchant, via the network, an identification of the object, and the merchant identifier;

identify a URL that corresponds to a webpage of the merchant, and that indicates that the object is to be added to an online shopping cart of the merchant that corresponds to the first user account;

cause an application of the electronic device to navigate to the URL and thereby transition the electronic device from displaying a webpage of the object management service to displaying the webpage of the merchant corresponding to the URL such that the webpage of the merchant displayed by the electronic device indicates that the object has been added to the online shopping cart of the merchant that is associated with the first user account;

receive, at the object management service and from the merchant, via the network, a notification of a purchase of the object and at least one of the object management service identifier or the merchant identifier; and in response to receiving the notification and at least one of the object management service identifier or the merchant identifier, remove the object identifier from the cart set associated with the user.

2. The computing system of claim 1, wherein the representation of the object is provided to the object management service by at least one user of the object management service.

3. The computing system of claim 1, the computer-executable instructions that when executed by the one or more processors further cause the one or more processors to at least:

in response to receiving the notification that the user has purchased the object, move the object identifier from the cart set of the object management service to a purchased set of the object management service associated with the user.

4. The computing system of claim 1, the computer-executable instructions that when executed by the one or more processors to determine the merchant, further include instructions that cause the one or more processors to at least:

identify one of a plurality of merchants for the object, wherein each of the plurality of merchants has indicated to the object management service an ability to sell the object.

5. The computing system of claim 1, wherein the merchant is a source of the representation.

6. A non-transitory computer-readable storage medium storing instructions for coordinating purchase of objects, the instructions when executed by one or more processors causing the one or more processors to at least:

receive by an object management service, via a network and from a merchant that is independent of the object management service, a merchant identifier for a first user account of a user associated with the merchant, wherein the merchant identifier is a code that corresponds to the first user account with the merchant and that uniquely identifies the user account to the merchant without including any personally identifiable information about the user;

associating the merchant identifier with an object management service identifier for a second user account of the user associated with the object management service;

subsequent to an association of the merchant identifier with the object management service identifier:

receive, by the object management service via the network and from an electronic device, a request to purchase an object that is represented by an object identifier of the object management service;

determine that the merchant is able to sell the object to the user;

subsequent to the request to purchase the object being received from the electronic device, provide from the object management service and to the merchant via the network, an identification of the object, and the merchant identifier;

identify a URL that corresponds to a webpage of the merchant, and that indicates that the object is to be added to an online shopping cart of the merchant that is associated with the first user account; and cause an application of the electronic device to navigate to the URL and thereby transition the electronic device from displaying a webpage of the object management service to displaying the webpage of the merchant corresponding to the URL such that the webpage of the merchant displayed by the electronic device indicates that the object has been added to the online shopping cart of the merchant that is associated with the first user account;

receive, at the object management service and from the merchant, via the network, a notification of a purchase of the object and at least one of the object management service identifier or the merchant identifier; and in response to receiving the notification and at least one of the object management service identifier or the merchant identifier, remove, from a cart set of the object management service, an object identifier that includes a representation of the object, wherein the cart set is associated with the user.

7. The non-transitory computer-readable storage medium of claim 6, wherein the instructions when executed by the one or more processors further cause the one or more processors to at least receive a financial sum from the merchant.

8. The non-transitory computer-readable storage medium of claim 6, wherein the instructions when executed by the one or more processors further cause the one or more processors to at least:

add an object identifier that includes a representation of the object to the cart set associated with the user; and in response to receiving the notification, add the object identifier that includes the representation of the object to a purchased set associated with the user.

9. A computer-implemented method, comprising:

under control of one or more computing systems configured with executable instructions, receiving, at an object management service, via a network and from a merchant that is independent of the object management service, a merchant identifier for a first user account of a user associated with the merchant, wherein the merchant identifier is a code that corresponds to the first user account with the merchant and that uniquely identifies the user account to the merchant without including any personally identifiable information about the user;

associating, at the object management service, the merchant identifier with a second user account of the user associated with the object management service;

subsequent to associating:

receiving, at the object management service, a request from an electronic device associated with a user to add an object identifier to a cart set of the object management service, wherein the object identifier includes a representation of an object, and the object identifier is accessible from the object management service;

in response to the request, adding the object identifier to the cart set, wherein the cart set is associated with the user;

receiving at the object management service, via the network, a request from the user to purchase the object;

determining the merchant is able to sell the object;

subsequent to the request to purchase the object being received from the electronic device, providing from the object management service and to the merchant via the network, an identification of the object and the merchant identifier;

causing an application of the electronic device to navigate to a webpage of the merchant and thereby transitioning the electronic device from displaying a webpage of the object management service to displaying the webpage of the merchant such that the webpage of the merchant displayed by the electronic device indicates that the object has been to an online shopping cart of the merchant that is associated with the first user account;

receiving at the object management service and from the merchant, a notification of a purchase of the object; and in response to receiving the notification, removing the object identifier from the cart set.

10. The computer-implemented method of claim 9, wherein the representation of the object is provided to the object management service by at least one user of the object management service.

11. The computer-implemented method of claim 9, further comprising:

in response to receiving the notification, including the object identifier in a purchased set of the object management service associated with the user.

12. The computer-implemented method of claim 9, wherein determining the merchant is able to sell the object further includes:

determining the merchant from one of a plurality of merchants, wherein each of the plurality of merchants has indicated to the object management service an ability to sell the object.

13. The computing system of claim 1, wherein the object identifier is provided to the object management service by a second user that is distinct from the user and the merchant.

* * * * *